United States Patent [19]

Cahill

[11] Patent Number: 5,484,745
[45] Date of Patent: Jan. 16, 1996

[54] METHOD FOR FORMING A SEMICONDUCTOR SENSOR

[75] Inventor: Sean S. Cahill, Menlo Park, Calif.

[73] Assignee: Yazaki Meter Co., Ltd., Tokyo, Japan

[21] Appl. No.: 141,055

[22] Filed: Oct. 26, 1993

[51] Int. Cl.⁶ .................................... H01L 27/20
[52] U.S. Cl. ..................... 437/63; 437/228; 437/927;
  437/974; 437/901; 148/DIG.12; 148/DIG. 159
[58] Field of Search ................. 437/63, 927, 974,
  437/228, 901, 7, 63, 974; 148/DIG. 12,
  DIG. 159

[56] References Cited

U.S. PATENT DOCUMENTS

| | | | |
|---|---|---|---|
| 4,618,397 | 10/1986 | Shimizu et al. | 156/628 |
| 4,808,549 | 2/1989 | Mikkor et al. | 437/901 |
| 5,062,302 | 11/1991 | Petersen et al. | 73/DIG. 4 |
| 5,161,532 | 11/1992 | Joseph | 128/635 |
| 5,169,599 | 12/1992 | Joseph et al. | 422/57 |
| 5,209,118 | 5/1993 | Terman | 73/715 |
| 5,257,546 | 11/1993 | Tobita et al. | 73/727 |

Primary Examiner—Tuan H. Nguyen
Attorney, Agent, or Firm—Sughrue, Mion, Zinn, Macpeak & Seas

[57] ABSTRACT

A method for forming at least one corrugation member in a semiconductor material, contains the step of: forming a semiconductor material layer onto a substrate, masking a first surface of the semiconductor material, etching the first surface to form first cavity thereon, removing a mask from the semiconductor material, masking the first surface and second surface of the semiconductor material, etching the second surface to form second cavity thereon, the second cavity being defined into the first cavity, removing the mask from the semiconductor material, depositing a specified masking material selected in accordance with a characteristic of the substrate onto the semiconductor material, etching an unmasked portion of the semiconductor material and depositing the same material as the abovementioned specified masking material selected in accordance with a characteristic of the substrate onto the semiconductor material and the specified masking material which has been deposited onto the semiconductor to form the corrugation member.

7 Claims, 3 Drawing Sheets

METHOD FOR FORMING A SEMICONDUCTOR SENSOR

BACKGROUND OF THE INVENTION

1. Field of the invention

This invention relates to a semiconductor sensor having a corrugation support member, more specifically, a method of forming the corrugation support is obtained in accordance with a characteristic of a base substrate.

2. Related Art

It is well known that corrugated diaphragms provide advantages over flat diaphragms in utilizing, for example, a pressure transducer. One of the advantages is that the corrugated diaphragm is a more travel distance per unit of applied force.

In conventional art described in U. S. Pat. No. 5,064,165, as shown in FIGS. 8–11, a process for forming corrugated pressure transducers or the like is described. In FIG. 8, a wafer 101 is made of, for example, silicon. First, a top surface 102 of the wafer 101 is masked by depositing either an oxide or a nitride layer 103. In the same manner, second surface 104 is masked at the same time or later by material described above. Thereafter, as shown in FIG. 8, a portion of the layer 103 is removed in the areas where corrugations are to be etched (at the portion 105). The top surface 102 of the silicon material is etched by using a silicon etching gas, such as sulfur hexafluoride. Then, as shown in FIG. 9, profiles 106 is formed in accordance with type of etching process. After that, the layer 103 is removed from the top surface 102. Then, in FIG. 10, an etch stop 107 is diffused into top surface. The etch stop 107 is typically provided by doping surface with an impurity. Thereafter, a mask is formed in the layer 103 formed on the second surface 104. The second surface 104 is then etched to remove the silicon up to the etch stop 66 with corrugations 108 being formed.

However, in this method, in order to form the corrugation, the surface of the wafer is masked by depositing either the oxide or the nitride layer, thereafter, the oxide or nitride layer serving as mask should be removed from the wafer prior to the deposition of the doping surface.

SUMMARY OF THE INVENTION

In view of the forgoing problem, an object of the present invention is to provide method for forming a corrugation in a semiconductor in accordance with a characteristic of a substrate on which the corrugation is formed.

According to an aspect of the present invention, there is provided a method for forming at least one corrugation member in a semiconductor material, comprising the step of: forming a semiconductor material layer onto a substrate; masking a first surface of the semiconductor material; etching the first surface to form first cavity thereon; removing a mask from the semiconductor material; masking the first surface and second surface of the semiconductor material; etching the second surface to form second cavity thereon, the second cavity being defined into the first cavity; removing the mask from the semiconductor material; depositing a specified masking material selected in accordance with a characteristic of the substrate onto the semiconductor material; etching an unmasked portion of the semiconductor material; and depositing the same material as the specified masking material selected in accordance with a characteristic of the substrate onto the semiconductor material and the specified masking material which has been deposited onto the semiconductor to form the corrugation member.

According to the present invention, in order to form the corrugation, the specified material serving as a mask is deposited onto the epitaxial layer in accordance with a characteristic of the substrate so that it is unnecessary to remove this masking material from the substrate. Therefore, a step for removing the mask from substrate is omitted from steps for forming an etch stop layer, which are contained in a manufacturing process of the semiconductor sensor or the like.

BRIEF DESCRIPTION FOR THE DRAWINGS

FIGS. 1–7 are sectional views of showing processes for producing a corrugation in a semiconductor sensor according to the present invention; and FIGS. 8–11 are sectional views of showing processes for producing the semiconductor sensor of a conventional art.

DETAILED DESCRIPTION OF PREFERRED EMBODIMENT

A preferred embodiment of the present invention will now be described with reference to the drawings.

Figure 1:
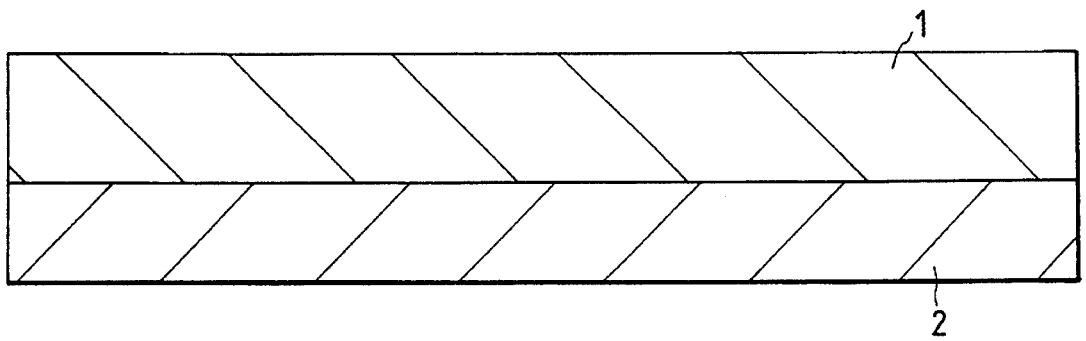

In FIG. 1, a substrate 1 such as polished, p-type silicon wafers is obtained. An epitaxial layer 2 which is in n-type is deposited on the substrate 1, for example, in thickness of approximately 6 μm.

Figure 2:
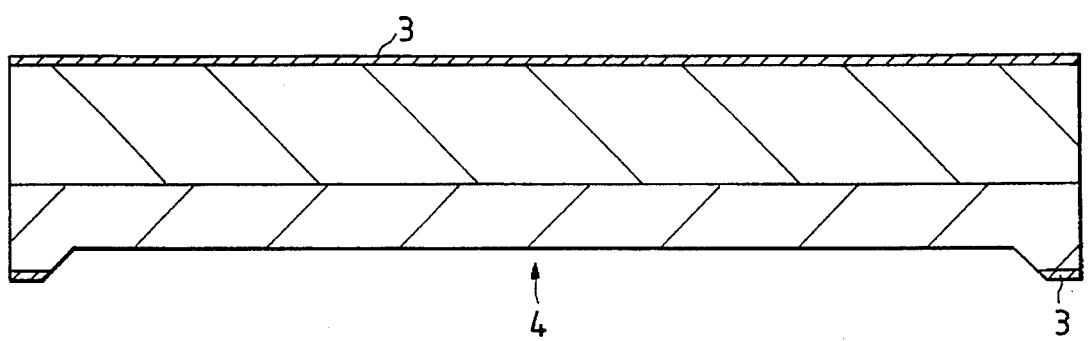

Next, in FIG. 2, surfaces of the substrate and the epitaxial layer 2 as first surface are oxidized so as to form first oxide layers 3. A side of the epitaxial layer 2 is patterned and etched to form first cavity 4 serving as capacitor gap or the like, eventually. It is preferable to carry out this process with a very slow anisotropic etch which produces a smooth bottom surface. After that the first oxide layer 3 is removed from the substrate 1 and the epitaxial layer 2.

Figure 3:
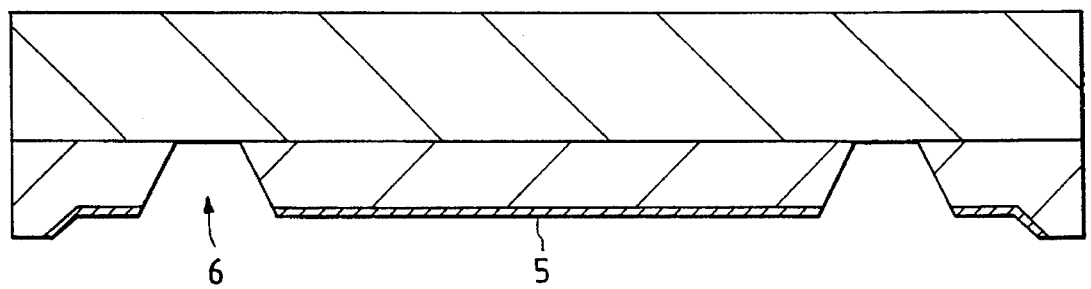

Further, in FIG. 3, a second oxide layer 5 is grown on a surface of the epitaxial layer 2, as second surface, and the side of the epitaxial layer 2 is patterned and etched, again, to form second cavity 6. After that, the second oxide layer 5 is removed from the epitaxial layer 2.

Figure 4:
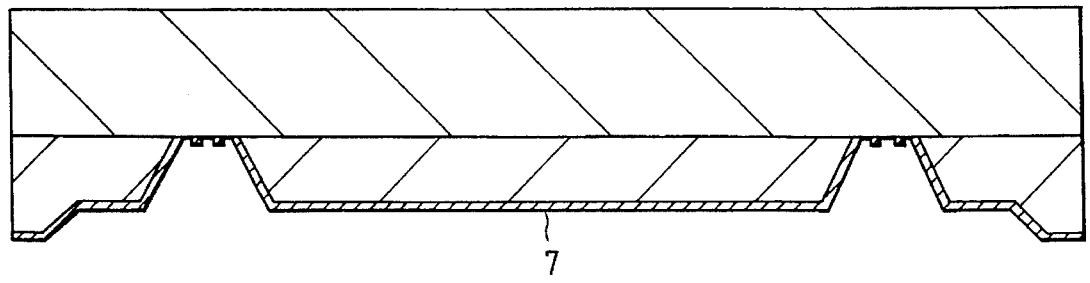

In FIG. 4, n-type material, for example PSG (phospho silicate glass) in this embodiment, is deposited onto the epitaxial layer 2 with a predetermined pattern to produce first layer 7 of n-type material. The first layer 7 serves as the etch mask for forming a corrugation. When the substrate 1 is made of n-type silicon, a material deposited onto the epitaxial layer 2 is selected from p-type material (for example, BSG (boro silicate glass)). This relationship is obtained by etching process applied to the substrate 1 described hereinbelow. More particularly, a material to be deposited onto the epitaxial layer 2 depends upon the characteristic of the substrate 1. Therefore, in this embodiment, a typical PSG deposition is performed in the condition that a doping level in the silicon is in substantially $1.0 \times 10^{21}$ atoms/cm$^3$ for phosphorus at diffusion temperatures of 1000° C. or greater.

Figure 5:
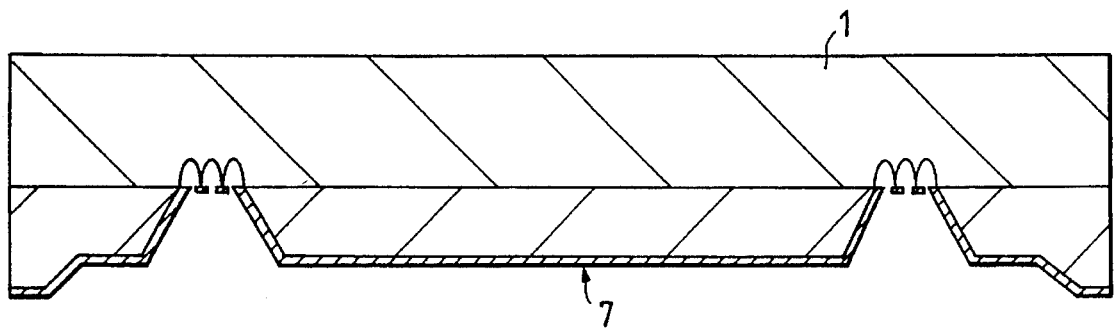
Figure 6:
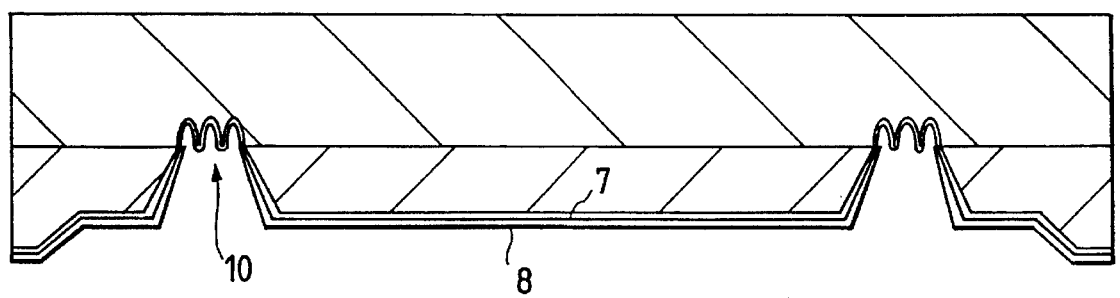

In FIG. 5, a surface of the second cavity 6 is etched to form a formation of corrugations. This process is preferable to employ a dry etching process. In FIG. 6, n-type material is deposited or annealed onto the first layer 7 to form second layer 8 of n-type material without removing the first layer 7 from the epitaxial layer 2 so as to form an etch stop layer with a patterned portion 10.

Figure 7:
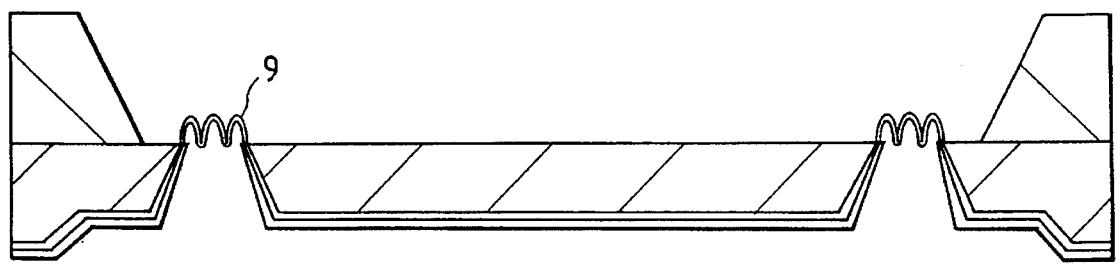
Figure 8:
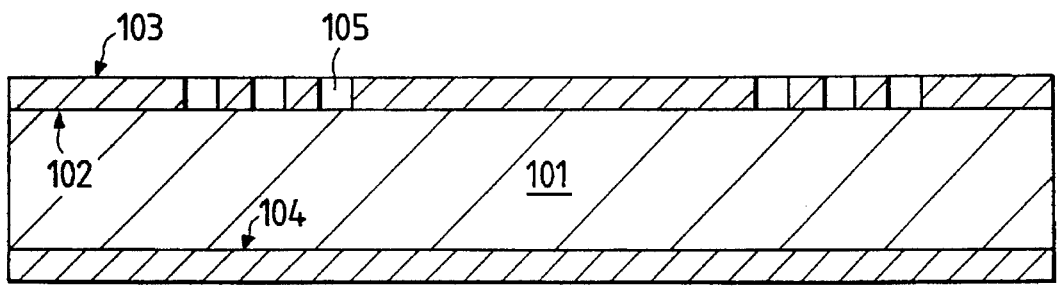
Figure 9:
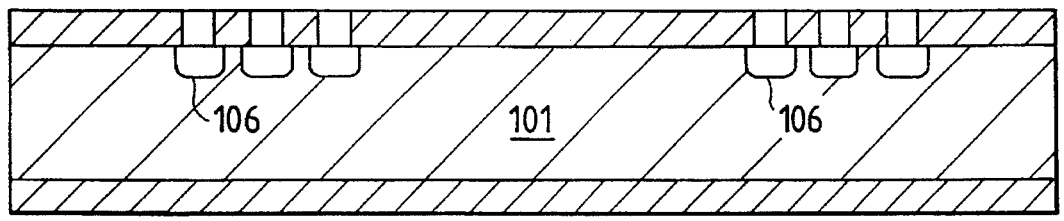
Figure 10:
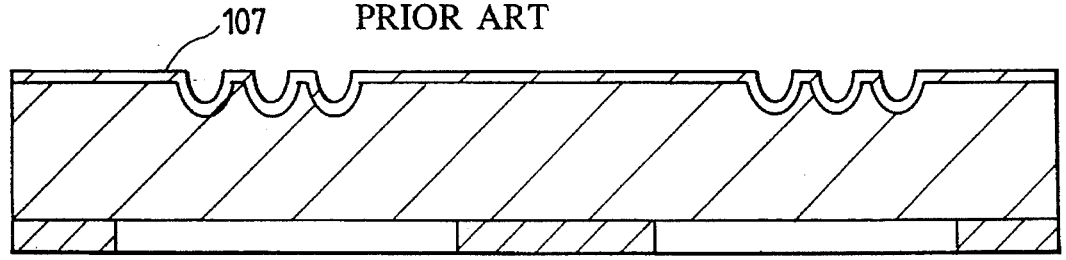
Figure 11:
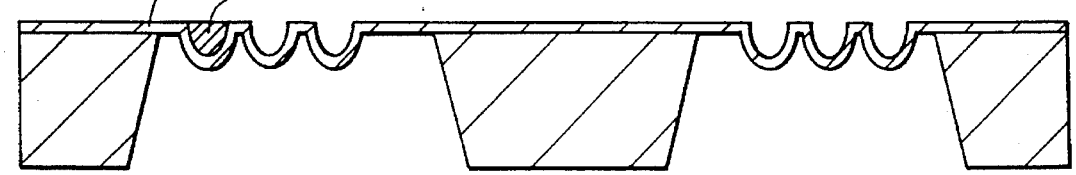

In FIG. 7, the substrate 1 are then etched by, for example, the electrochemically etched. In this case, this etching process is selected in such a manner that it does not etch n-type silicon. The etch taken from a top surface of the substrate 1 proceeds until the corrugation 9 serving as the etch stop. After the substrate is etched, the corrugation 9 is formed on the epitaxial layer 2.

In this case, when the substrate is made of the p-type silicon, the material of the layer which is deposited or annealed onto the epitaxial layer is selected from a n-type impurity group consisting of phospho silicate glass, arsenosilicate glass, et al.

Therefore, when the substrate 1 is made of the n-type silicon, the material of the layer which is deposited or annealed onto the epitaxial layer 2 is selected from a p-type impurity group consisting of boro silicate glass or the like.

In other words the material of the layer which is deposited or annealed onto the epitaxial layer is selected in accordance with the characteristic of the substrate.

According to the present invention, in order to form the corrugation serving as the etch mask, the layer serving as the mask is deposited onto the epitaxial layer in consideration of the material of the substrate onto which the epitaxial layer is deposited. The layer is thus deposited or annealed onto the layer which has been deposited on the epitaxial layer without removing the layer from the epitaxial layer. In other words, the layer is laminated onto the layer which has been deposited on the epitaxial layer. Therefore, the oxide layer removing process is omitted from the manufacturing process of the corrugation formed onto the layer.

What is claimed is:

1. A method for forming at least one corrugation member, comprising the step of:

forming a semiconductor material layer onto a surface of a substrate, said semiconductor material layer including a first surface facing the substrate and a second, opposite surface;

depositing a first masking material layer on a portion of said second surface of the semiconductor material layer so as to provide a masked portion and an unmasked portion thereon;

etching the unmasked portion of said semiconductor material layer to form a cavity therein and expose a portion of said substrate surface;

removing the first masking material layer from said masked portion of the semiconductor material layer;

depositing a second masking material layer onto the second surface and onto a portion of said exposed portion of said substrate;

etching an unmasked portion of the exposed portion of said substrate to form at least one recessed surface therein; and depositing an etch stop material on said second masking material and on said recessed surface to form the corrugation member.

2. A method for forming at least one corrugation member as claimed in claim 1, further comprising the step of:

etching the substrate from a surface opposite to said surface of the substrate until the corrugation is defined.

3. A method for forming at least one corrugation member as claimed in claim 1, wherein the substrate is made of a n-type silicon, and the second masking material is made of p-type material.

4. A method for forming at least one corrugation member as claim in claim 3, wherein the second masking material is selected from a group essentially consisting of phospho silicate glass and arsenosilicate glass.

5. A method for forming at least one corrugation member as claimed in claim 1, wherein the substrate is made of a p-type silicon, and the second masking material is made of n-type material.

6. A method for forming at least one corrugation member as claimed in claim 5, wherein the second masking material is selected from a group essentially consisting of borosilicate glass.

7. The method of claim 1, further comprising the steps of masking a portion of said second surface and etching the unmasked portion so as to form an aperture therein before the step of depositing said first masking material layer.

* * * * *